(12) United States Patent
Lee et al.

(10) Patent No.: US 8,147,938 B2
(45) Date of Patent: *Apr. 3, 2012

(54) BRAID-REINFORCED COMPOSITE HOLLOW FIBER MEMBRANE

(75) Inventors: Moo Seok Lee, Seoul (KR); Kwang Jin Lee, Suwon-si (KR); Yong-Cheol Shin, Seoul (KR)

(73) Assignee: Kolon Industries, Inc., Kwacheon-Si (KR)

( * ) Notice: Subject to any disclaimer, the term of this patent is extended or adjusted under 35 U.S.C. 154(b) by 389 days.

This patent is subject to a terminal disclaimer.

(21) Appl. No.: 12/095,282

(22) PCT Filed: Nov. 28, 2006

(86) PCT No.: PCT/KR2006/005033
§ 371 (c)(1),
(2), (4) Date: May 28, 2008

(87) PCT Pub. No.: WO2007/064124
PCT Pub. Date: Jun. 7, 2007

(65) Prior Publication Data
US 2008/0292823 A1    Nov. 27, 2008

(30) Foreign Application Priority Data
Nov. 29, 2005   (KR) .......................... 10-2005-0114683

(51) Int. Cl.
*B32B 1/08*   (2006.01)

(52) U.S. Cl. .............. 428/36.3; 428/35.7; 428/36.1; 428/36.91; 210/500.1; 210/500.21; 210/500.23

(58) Field of Classification Search ............... 428/35.7, 428/36.1, 36.3, 36.91; 210/500.1, 500.21, 210/500.23
See application file for complete search history.

(56) References Cited

U.S. PATENT DOCUMENTS 3,948,781 A * 4/1976 Brun et al. ............. 210/500.37
(Continued)

FOREIGN PATENT DOCUMENTS
EP    1321178 A2    6/2003
(Continued)

OTHER PUBLICATIONS

Haddad and Black, Mechanical Parameters Influencing Coating Adhesion of Fabrics, Journal of Industrial Textiles, vol. 16, No. 2, pp. 123-138, Oct. 1986.*

*Primary Examiner* — Andrew Piziali
(74) *Attorney, Agent, or Firm* — Sughrue Mion, PLLC

(57) ABSTRACT

A braid-reinforced composite hollow fiber membrane is disclosed. The braid-reinforced composite hollow fiber membrane comprising a reinforcing material of a tubular braid and a polymer resinous thin film coated on the surface of the tubular braid according to the present invention is characterized in that: the tubular braid comprises multifilaments made of monofilaments having a crimp rate of 2 to 40%, and the peeling strength of the tubular braid and a polymer resinous thin film coated on the surface thereof is 1 to 10 MPa. In the composite hollow fiber membrane, the crimp rate of the monofilaments constituting the tubular braid of the reinforcing material is 2 to 40%, thus the surface area of the tubular braid contacted with the polymer resinous thin film is increased. Thus, the peeling strength of the tubular braid and the polymer resinous thin film coated on the surface thereof is excellent.

9 Claims, 1 Drawing Sheet

U.S. PATENT DOCUMENTS

| | | |
|---|---|---|
| 4,061,821 A | 12/1977 | Hayano et al. |
| 5,472,607 A | 12/1995 | Mailvaganam et al. |
| 6,354,444 B1 | 3/2002 | Mahendran et al. |
| 7,909,177 B2 * | 3/2011 | Lee et al. .................. 210/490 |
| 2005/0205488 A1 * | 9/2005 | Shinada et al. ............. 210/490 |

FOREIGN PATENT DOCUMENTS

| | | |
|---|---|---|
| JP | 07-275666 | 10/1995 |
| KR | 1020030047715 A | 6/2003 |
| KR | 1020030062198 A | 7/2003 |
| KR | 1020040008935 A | 1/2004 |

* cited by examiner

BRAID-REINFORCED COMPOSITE HOLLOW FIBER MEMBRANE

This is a National Stage 371 Application of PCT/KR2006/005033 filed Nov. 28, 2006, which claims priority from Korean Patent Application 10-2005-0114683 filed on Nov. 29, 2005, all of which are incorporated herein by reference.

BACKGROUND OF THE INVENTION

1. Field of the Invention

The present invention relates to a composite hollow fiber membrane having an excellent peeling strength, filtration reliability, and water permeability.

Recently, polymer separation membranes are being utilized in more various fields as well as existing application fields with the improvement of their techniques. Particularly, with the importance of environment, demands for them are being increased in the fields of water treatment. In all application fields of separation membranes, a mechanical strength, such as peeling strength, always stands out as an important factor as well as selectiveness and water permeability. Particularly, in water treatment fields, an excellent mechanical strength is necessarily required, simultaneously with a high permeability, from the viewpoint of the reliability of a separation membrane system.

2. Background Art

A hollow fiber-shaped membrane has a high permeability per installation area and is suitable for water treatment, whereas the mechanical strength thereof has been a problem to be solved due to the characteristics of a porous membrane structure. Thus, a hollow fiber membrane reinforced with a fabric or tubular braid having an excellent mechanical strength as a support of the separation membrane. Such a general idea of a composite membrane is a well known fact.

Techniques thereof are disclosed in U.S. Pat. No. 4,061,821, U.S. Pat. No. 3,644,139, U.S. Pat. No. 5,472,607, U.S. Pat. No. 6,354,444 and the like. Among them, a general idea of a composite hollow fiber membrane using a tubular braid was disclosed for the first time in U.S. Pat. No. 4,061,821 to Hayano et al. In this technique, however, the tubular braid is not used as a support for coating, but it is completely embedded in the membrane in order to compensate for a reduction of water permeability due to the shrinkage occurred when an acryl hollow fiber type membrane is solely used at a temperature higher than 80° C. Such a composite membrane has a larger thickness than the thin film coated on a support, and the embedded braid increases the resistance of fluid flow for thereby significantly reducing the water permeability.

Unlike the prior art, in U.S. Pat. No. 5,472,607, a reinforcing material is not embedded in the membrane, but is coated on its surface with a thin film by coating method of the existing flat composite membrane. In manufacturing a composite hollow fiber membrane having a thin film layer coated on the surface of a reinforcing material or supporting material of a tubular braid, thermodynamic stability differs according to the composition of a dope to be used for coating. This determines the structure of the coated thin film layer.

That is to say, in case of a thermodynamically stable dope, it has a finger-like structure. On the contrary, a dope with a low thermodynamic stability has a sponge structure with no defect region. For instance, in case of a dope used a solvent having a strong solvent power such as N-methyl-2-pyrrolidone (NMP) among organic solvents, it can easily form a finger-type structure because it has a high thermodynamic stability.

Additionally, the water permeability and mechanical strength of the overall composite hollow fiber membrane depends upon the structure and properties of the thin film layer. This is because the thin film layer has small pores and a low mechanical strength than a tubular braid reinforcing material having relatively much larger pores and a higher strength. In other words, the filtrate having passed through the thin film layer passes through a braid supporting layer with relatively large pores without a large resistance. While, since the thin film layer has a large flow resistance, the water permeability of the overall membrane is determined according to a microporous structure and porosity.

In view of strength, the tensile strength, pressure resistance and the like are complemented by the braid reinforcing material having a far superior mechanical strength. However, if the strength of the thin film is reduced, the thin film is separated or damaged.

In U.S. Pat. No. 4,061,821 and U.S. Pat. No. 5,472,607, the significance of the coated thin film layer structure was overlooked in relative to the present invention. Particularly, the structure of the thin film layer in the two prior arts has a porous region larger than 5 μm in an inner layer of a skin, that is, the inner layer has some micro pores having a pore diameter larger than 5 μm.

FIG. 2 is an exploded sectional view of a composite hollow fiber membrane disclosed in U.S. Pat. No. 4,061,821; and FIG. 3 is an exploded sectional view of a composite hollow fiber membrane disclosed in U.S. Pat. No. 5,472,607. These membranes are in a finger-like structure as shown in FIGS. 2 and 3 and have a defect region D functioning as a defect in the thin film layer.

As seen from the well-known fact, they can acts as a defect in expressing the mechanical properties of the thin film. Particularly, when the skin of a dense layer is damaged, a material capable of being secondarily cut off by the inner layer is permeated. This reduces the filtration reliability of the membrane relatively.

The composite hollow fiber membrane is suitable, particularly for filtration modules in the fields of water treatment due to its superior mechanical strength. In such a filtration module, there is a possibility of damaging the surface of the membrane by the friction and physical impact generated between membranes due to aeration. Particularly, filtration by the inner layer is required so as to ensure high filtration reliability.

Meanwhile, U.S. Pat. No. 6,354,444 proposes a composite hollow fiber membrane coated with a polymer resinous thin film on a braid made composite hollow fiber membrane, the braid is made of monofilaments of 0.5 or higher denier without crimp, so the surface area of the braid contacted with the polymer resinous thin film is small, which leads to a low peeling strength between the braid and the polymer resin coated on its surface.

DETAILED DESCRIPTION OF THE INVENTION

Problem to be Solved by the Invention

It is an object of the present invention to provide a composite hollow fiber membrane having an excellent peeling strength, filtration reliability, and water permeability by coating a polymer resinous thin film on the support of a braid.

The present invention provides a composite hollow fiber membrane which increases the surface area of a tubular braid contacted with a polymer resinous thin film and has excellent peeling strength of a tubular braid and a polymer resinous thin film coated on the surface thereof by giving a crimp rate of a predetermined range to the monofilaments constituting the tubular braid and making the monofilaments superfine.

Technical Solution

The braid-reinforced composite hollow fiber membrane comprising a reinforcing material of a tubular braid and a polymer resinous thin film coated on the surface of the tubular braid according to the present invention is characterized in that: the tubular braid comprises multifilaments made of monofilaments having a crimp rate of 2 to 40%, and the peeling strength of the tubular braid and a polymer resinous thin film coated on the surface thereof is 1 to 10 MPa.

The present invention will now be described in detail with reference to the accompanying drawings.

The composite hollow fiber membrane of the present invention has a structure in which a polymer resinous thin film (A) is coated on the surface of the reinforcing material of a tubular braid (B). FIG. 1 is a schematic cross sectional view of a composite hollow fiber membrane according to the present invention.

In the present invention, the tubular braid comprises multifilaments consisting of monofilaments having a crimp rate of 2 to 40% and, thus the peeling strength of the tubular braid and the polymer resinous thin film coated on the surface thereof is very excellent, that is, 1 to 10 MPa.

If the crimp rate is less than 2%, the surface area of the tubular braid (B) contacted with the polymer resinous thin film (A) is reduced, which decrease the peeling strength to less than 1 MPa. If the crimp rate is greater than 300% 40%, the process stability in the production of a tubular braid is decreased.

Preferably, the tubular braid (B) comprises multifilaments consisting of monofilaments having a fineness of 0.01 to 0.4 denier.

If the fineness of the monofilaments is above 0.4 denier, the surface area of the tubular braid (B) contacted with the polymer resinous thin film is reduced, which leads to a low peeling strength of less than 1 MPa between the tubular braid (B) and the polymer resinous thin film (A) coated on its surface.

In addition, if the fineness of the monofilaments is less than 0.01 denier, the initial wetting property and peeling strength of the tubular braid (B) and the polymer resinous thin film (A) are improved, but the manufacturing process becomes complicated and the manufacturing costs are raised.

Preferably, the multifilaments constituting the tubular braid (B) consist of 150 to 7,000 monofilaments and have a total fineness of 30 to 140 deniers.

Preferably, the tubular braid (B) is knit by using 16 to 60 gray yarns for knitting prepared by combining 4 to 10 multifilaments.

The polymer resinous thin film comprises a skin layer of a dense structure and an inner layer of a sponge structure. The skin layer is formed with micro pores having a diameter in the range from 0.01 to 1 μm. The inner layer is formed with micro pores having a diameter less than 10 μm, preferably, 5 μm.

The present invention is characterized in that it has no defect region larger than 10 μm in the inner layer of the polymer resinous thin film, that is, there exist no micro pores having a diameter larger than 10 μm.

In a case that any defect region larger than 10 μm exists in the inner layer, the filtration reliability can be reduced greatly. Preferably, the diameters of micro pores formed in the inner layer of the sponge structure are continuously and gradually increased with the approach to the central direction of the composite hollow fiber membrane.

To improve both mechanical strength and water permeability, it is preferable that the thickness of the polymer resinous thin film is less than 0.2 mm and the penetrating length of the polymer resinous thin film into the reinforcing material is less than 30% of the reinforcing material thickness.

The polymer resinous thin film is made from a spinning dope consisting of polymer resin, organic solvent, polyvinylpyrrolidone and hydrophilic compound.

The composite hollow fiber membrane of the present invention can be made by passing a tubular braid (reinforcing material) through the center portion of a double tubular nozzle and simultaneously feeding a spinning dope for the polymer resinous thin film on the surface of the braid through the nozzle, coating the spinning dope on the braid, extruding them in the air of outside the nozzle, coagulating them in a external coagulating liquid to form the composite hollow fiber membrane structure, and washing and drying it.

At this time, the spinning dope for the polymer resinous thin film is obtained by dissolving polymer resin, polyvinylpyrrolidone and hydrophilic compound in an organic solvent. More preferably, the spinning dope is made of polymer resin of 10 to 50% by weight, polyvinylpyrrolidone and a hydrophilic compound of 9 to 30% by weight and an organic solvent of 20 to 89% by weight. However, in the present invention, the composition ratio of the spinning dope is not specifically limited.

The polymer resin is polysulfone resin, polyethersulfone resin, sulfonated polysulfone resin, polyvinylidenefluoride (PVDF) resin, polyacrylonitrile (PAN) resin, polyimide resin, polyamideimide resin, polyetherimide resin and so on. The organic solvent is dimethyl acetamide, dimethyl formamide or a mixture thereof.

The hydrophilic compound is water or glycol compound, and more preferably, polyethylene glycol having a molecular weight less than 2,000. Since the water or glycol compound, which is hydrophilic, reduces the stability of the spinning dope, it is more likely to form a sponge structure relatively.

That is, as the stability of the spinning dope becomes higher, it is more likely to form a finger-like structure because a defect region (micro pores having a diameter larger than 10 μm) is formed in the membrane. The present invention reduces the stability of the spinning dope by adding water or glycol compound, an additive, simultaneously to increase the water permeability by making the membrane hydrophilic.

Meanwhile, in the process of producing the composite hollow fiber membrane, in order to uniformly coat a polymer resinous thin film on the surface of the reinforcing material of the tubular braid at a predetermined thickness, the speed with which the tubular braid is advanced and the quantity of the spinning dope introduced into the nozzle must be balanced with each other. The relation between the feed rate (Q) of a spinning dope and the speed (u) of a tubular braid is expressed by the formula:

$$Q = \pi \rho v D_o T$$

[wherein Q denotes the feed rate of dope per hour, ρ denotes the density of dope, v denotes the advancing speed of the braid, $D_o$ denotes the outer diameter of the braid and T denotes the thickness of the dope to be coated.]

As seen from the above formula, in case that the advancing speed of the braid is high, a thin coating layer is formed. In case that the advancing speed of the braid is extremely higher in relative to the feed rate of the spinning dope, a non-uniform membrane with no coating layer on some parts is produced. Otherwise, a non-uniform membrane with a partially thick coating layer is produced. That is, it can be known that there exists an optimum speed ratio for stably producing a membrane with a uniform thickness.

In addition, the polymer resinous thin film of the composite hollow fiber membrane according to the present invention comprises a dense skin layer and an inner layer of a sponge structure whose pore diameter becomes gradually larger with the approach to the center of the composite hollow fiber membrane Due to this, the composite hollow fiber membrane of the present invention has an excellent peeling strength, initial wetting property, filtration reliability and water permeability.

In the present invention, the physical properties of the composite hollow fiber membrane are evaluated by the following method.

Crimp Rate

First, a composite hollow fiber membrane used as a sample is wound around a denier creel 10 times to prepare a bundle of yarns. At this time, the winding tensile force is equal to (nominal fineness×1/10 g).

An initial load (nominal fineness×1/20 g) and a static load (nominal fineness×2 g) are suspended on the produced bundle of yarns and put into water (20° C.±2° C.) and left therein for two minutes, and then the length L0 of the sample is measured.

The sample is taken out and only the static load is removed, and then put into the water again and left therein for three minutes, and with the same being put in the water, the length L1 of the sample is measured.

The measured lengths L0 and L1 of the sample were substituted into the following formula, to thus calculate (Cr, %):

$$\text{Crimp Rate}(Cr, \%) = \frac{L0 - L1}{L0} \times 100\%$$

Peeling Strength

The load at the instant when a coated polymer resinous thin film is peeled from a tubular braid by using a tensile tester was measured and divided into the area m² to which shear strength is applied to thus calculate the peeling strength.

Specific measurement conditions are as follows.
measuring instrument: Instron 4303
load cell: 1 KN
crosshead speed: 25 mm/min
sample: The sample was produced by bonding and securing one strand of a composite hollow fiber membrane to a polypropylene tube having a 6 mm diameter by using polyurethane resin so that the length of the bonding portion should be 10 mm.

$$\text{Peeling Strength}(Pa) = \frac{\text{load of yield point}(kg)}{\text{application area of shear strength}(m^2)}$$

The peeling strength is defined as the shear strength per unit area applied to a coated polymer resinous thin film when the sample is extended.

The application area (m²) of the shear strength is calculated by the formula: π×outer diameter of composite hollow fiber membrane×length of bonding portion of composite hollow fiber membrane.

Water Permeability

The water permeability was measured by preparing a mini-module having an effective length of 10 cm in the composite hollow fiber membrane and passing pure water through the module for a predetermined time by out-in flow method under a suction pressure of 1 kg at a temperature of 25° C.

$$\text{Water Permeability}(g/cm \cdot min \cdot kg/cm^2) = \frac{(\text{permeation quantity}(g))}{\left( \begin{array}{c} \text{permeation area of hollow fiber membrane}(cm^2) \times \\ \text{pressure}(kg/cm^2) \times \text{permeation time}(min) \end{array} \right)}$$

Shape of Micro Pores

The fracture surface of the polymer resinous thin film layer coated on the surface of the support (reinforcing material) was observed with a scanning electron microscope.

The composite hollow fiber membrane of the present invention produced by the above method has an excellent initial wetting property of 80 to 120% and an excellent peeling strength of 1 to 10 MPa between the tubular braid (B) and the polymer resinous film (A) coated on its surface.

EFFECT OF THE INVENTION

The peeling strength of the tubular braid and the polymer resinous thin film coated on the surface thereof is excellent, and at the same time, the initial wetting property of the composite hollow fiber membrane is excellent.

The composite hollow fiber membrane of the present invention is reinforced with a support of a braid and has no defect region greater than 10 μm in the inner layer (sponge structure) of the polymer resinous thin film (no micro pores greater than 10 μm formed in the inner layer. Therefore, the water permeability, mechanical strength and filtration reliability thereof are excellent.

BEST MODE FOR CARRYING OUT THE INVENTION

Figure 1:
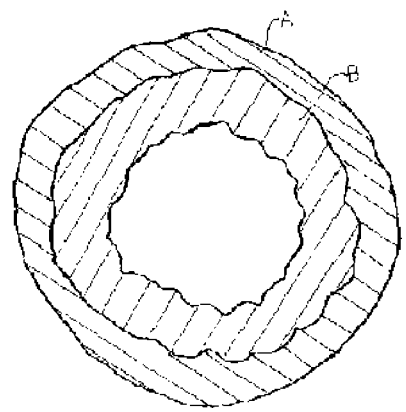
FIG. 1 is a schematic cross sectional view of a composite hollow fiber membrane according to the present invention.
Figure 2:
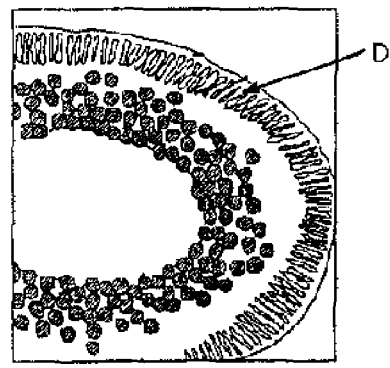
FIGS. 2 and 3 are enlarged cross sectional views of conventional hollow fiber membranes.
Figure 3:
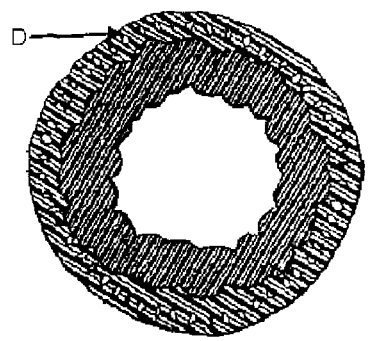

The present invention is now understood more concretely by comparison between examples of the present invention and comparative examples. However, the present invention is not limited to such examples.

Example 1

A spinning dope is prepared from components: 17% by weight of polysulfone, 9% by weight of polyvinylpyrrolidone, and 10% by weight of polyethyleneglycol added to 64% by weight of dimethylformamide (organic solvent), to produce a transparent spinning dope by mixing and dissolving the components. The spinning dope is fed into a double tubular nozzle having a 2.38 mmϕ diameter and simultaneously a tubular braid, which is knit to have an outer diameter of 2 mm by using 12 gray yarns for knitting prepared by combining 6 multifilaments having a crimp rate of 10% and a fineness of 80 deniers comprising 200 strands of monofilaments having a fineness of 0.4 denier, is passed through the center portion of the nozzle, to thus coat the spinning dope on the surface of the tubular braid and then extrude it in the air. At this time, the ratio (k) of the advancing speed of the braid to the feed rate of the spinning dope is 750 g/m², and the coating thickness of the spinning dope is 0.2 mm. After passing through the tubular braid coated with the spinning dope into a 10 cm air gap, it is coagulated in an external coagulating bath with a temperature of 35° C. Subsequently, the composite hollow fiber membrane is prepared by washing in a washing tank and winding. The result of evaluation for the structure and physical properties of the produced composite hollow fiber membrane is shown in Table 1.

Example 2

A composite hollow fiber membrane is produced in the same process and condition as Example 1, except that a tubular braid is used, which is knit to have an outer diameter of 2 mm by using 12 gray yarns for 110 knitting prepared by combining 6 multifilaments having a crimp rate of 20% and a fineness of 65 deniers comprising 650 strands of monofilaments having a fineness of 0.1 denier. The result of evaluation for the structure and physical properties of the produced composite hollow fiber membrane is shown in Table 1.

Comparative Example 1

A composite hollow fiber membrane is produced in the same process and condition as Example 1, except that a tubular braid is used, which is knit to have an outer diameter of 2 mm by using 16 gray yarns for knitting prepared by 3 multifilaments having a crimp rate of 0% and a fineness of 150 deniers comprising 300 strands of monofilaments having a fineness of 0.5 denier. The result of evaluation for the structure and physical properties of the produced composite hollow fiber membrane is shown in Table 1.

TABLE 1

Result of Physical Properties of Composite Hollow Fiber Membrane

| Classification | Example 1 | Example 2 | Comparative Example 2 |
|---|---|---|---|
| Peeling Strength (MPa) | 1.65 | 3.29 | 0.85 |
| Crimp rate (%) of monofilaments in tubular braid | 10 | 20 | 0 |

INDUSTRIAL APPLICABILITY

The peeling strength of the tubular braid and the polymer resinous thin film coated on the surface thereof is excellent, and at the same time, the filtration reliability and water permeability of the composite hollow fiber membrane are excellent.

The composite hollow fiber membrane of the present invention is reinforced with a support of a braid and has no defect region greater than 10 μm in the inner layer (sponge structure) of the polymer resinous thin film (no micro pores greater than 10 μm formed in the inner layer. Therefore, the water permeability, mechanical strength and filtration reliability thereof are excellent. As the result, the composite hollow fiber membrane of the present invention is particularly suitable for filtration modules in the fields of water treatment of a large size.

What is claimed is:

1. A braid-reinforced composite hollow fiber membrane comprising a reinforcing material of a tubular braid and a polymer resinous film coated on the surface of the tubular braid, wherein the tubular braid comprises multifilaments having a fineness of 30 to 140 deniers, each of the multifilaments consisting of 300-7000 monofilaments, said monofilaments having a crimp rate of 2 to 40% and a fineness of 0.01 to 0.4 denier, and wherein the peeling strength of the tubular braid and a polymer resinous film coated on the surface thereof is 1 to 10 MPa.

2. The braid-reinforced composite hollow fiber membrane of claim 1, wherein the tubular braid is knit by using 16 to 60 gray yarns, each of said yarns being comprised of 4 to 10 of the multifilaments.

3. The braid-reinforced composite hollow fiber membrane of claim 1, wherein the thickness of the polymer resinous film is less than 0.2 mm.

4. The braid-reinforced composite hollow fiber membrane of claim 1, wherein a penetrating length of the polymer resinous film into the reinforcing material is less than 30% of the reinforcing material thickness.

5. The braid-reinforced composite hollow fiber membrane of claim 1, wherein the polymer resinous film is made from a spinning dope consisting of polymer resin, organic solvent, polyvinylpyrrolidone and hydrophilic compound.

6. The braid-reinforced composite hollow fiber membrane of claim 5, characterized in that the polymer resin is polysulfone resin, polyethersulfone resin, sulfonated polysulfone resin, polyvinylidenefluoride resin, polyacrylonitrile resin, polyimide resin, polyamideimide resin or polyetherimide resin.

7. The braid-reinforced composite hollow fiber membrane of claim 5, wherein the hydrophilic compound is water or glycol compound.

8. The braid-reinforced composite hollow fiber membrane of claim 7, wherein the glycol compound is polyethylene glycol having a molecular weight less than 2,000.

9. The braid-reinforced composite hollow fiber membrane of claim 5, wherein the organic solvent includes dimethyl acetamide, dimethyl formamide or a mixture thereof.

* * * * *